US006922306B2

United States Patent
Tsuneyoshi et al.

(10) Patent No.: US 6,922,306 B2
(45) Date of Patent: Jul. 26, 2005

(54) TAPE RECORDING AND REPRODUCTION APPARATUS CAPABLE OF STABLE OPERATION WITH REDUCED WEAR

(75) Inventors: Nobutaka Tsuneyoshi, Tama (JP); Naoki Tatsumi, Tama (JP); Koichi Shimoyama, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 119 days.

(21) Appl. No.: 10/650,999

(22) Filed: Aug. 28, 2003

(65) Prior Publication Data

US 2004/0061971 A1 Apr. 1, 2004

(30) Foreign Application Priority Data

Sep. 26, 2002 (JP) ........................................ 2002-281901

(51) Int. Cl.[7] ............................................ G11B 5/027
(52) U.S. Cl. ....................................................... 360/85
(58) Field of Search ............................................ 360/85

(56) References Cited

U.S. PATENT DOCUMENTS 4,445,154 A * 4/1984 Kihara et al. .................. 360/85
4,491,886 A * 1/1985 Saito et al. .................... 360/85

* cited by examiner

Primary Examiner—George J. Letscher
(74) Attorney, Agent, or Firm—Ladas & Parry LLP

(57) ABSTRACT

A tape recording and reproduction apparatus includes a post base with a tape guide post, a leaf spring member pressing the post base against a post base catcher, and a leaf spring member control part. The leaf spring member control part presses the leaf spring member so that a gap is formed between the post base catcher and the leaf spring member, and removes the press on the leaf spring member so that the leaf spring member presses the post base against the post base catcher. The leaf spring member control part presses the leaf spring member so as to form the gap when the post base moves to the side of the post base catcher opposing the leaf spring member. The leaf spring member control part removes the press on the leaf spring member when the post base enters the gap.

5 Claims, 19 Drawing Sheets

FIG.8
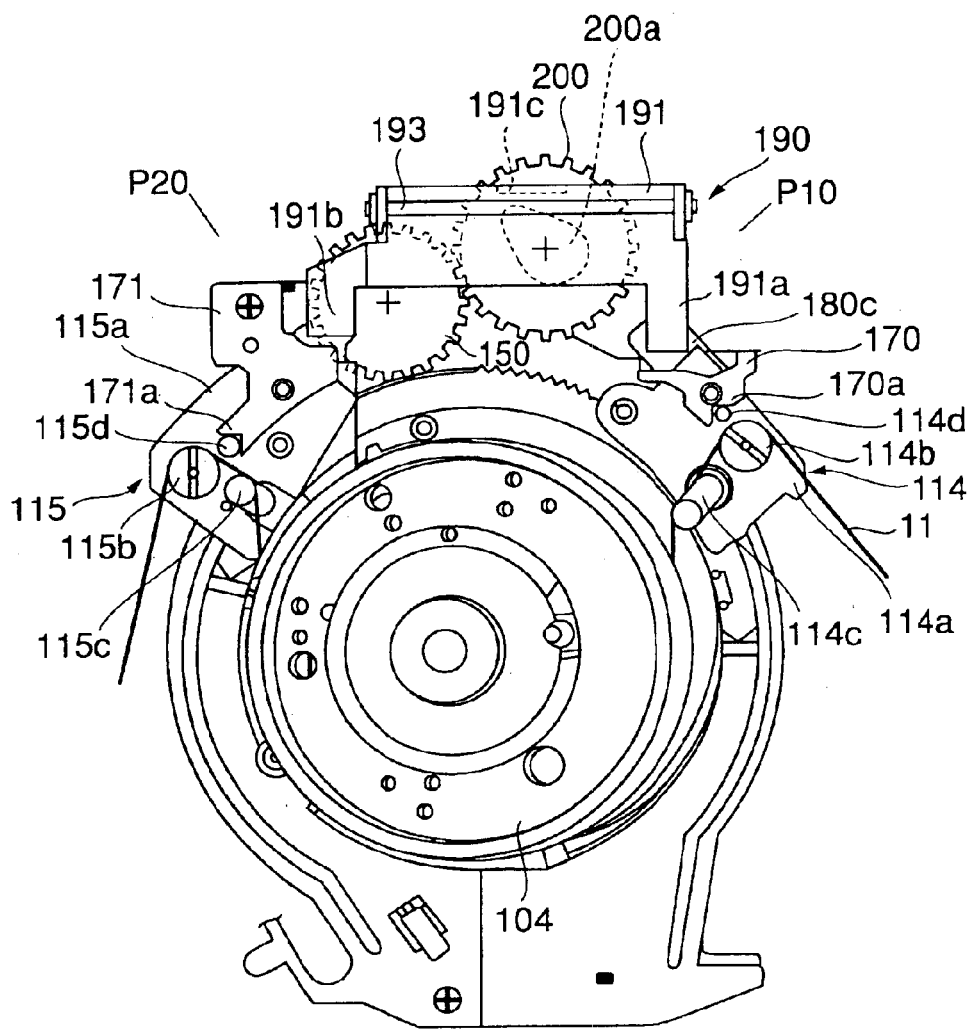
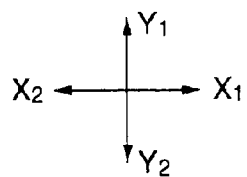

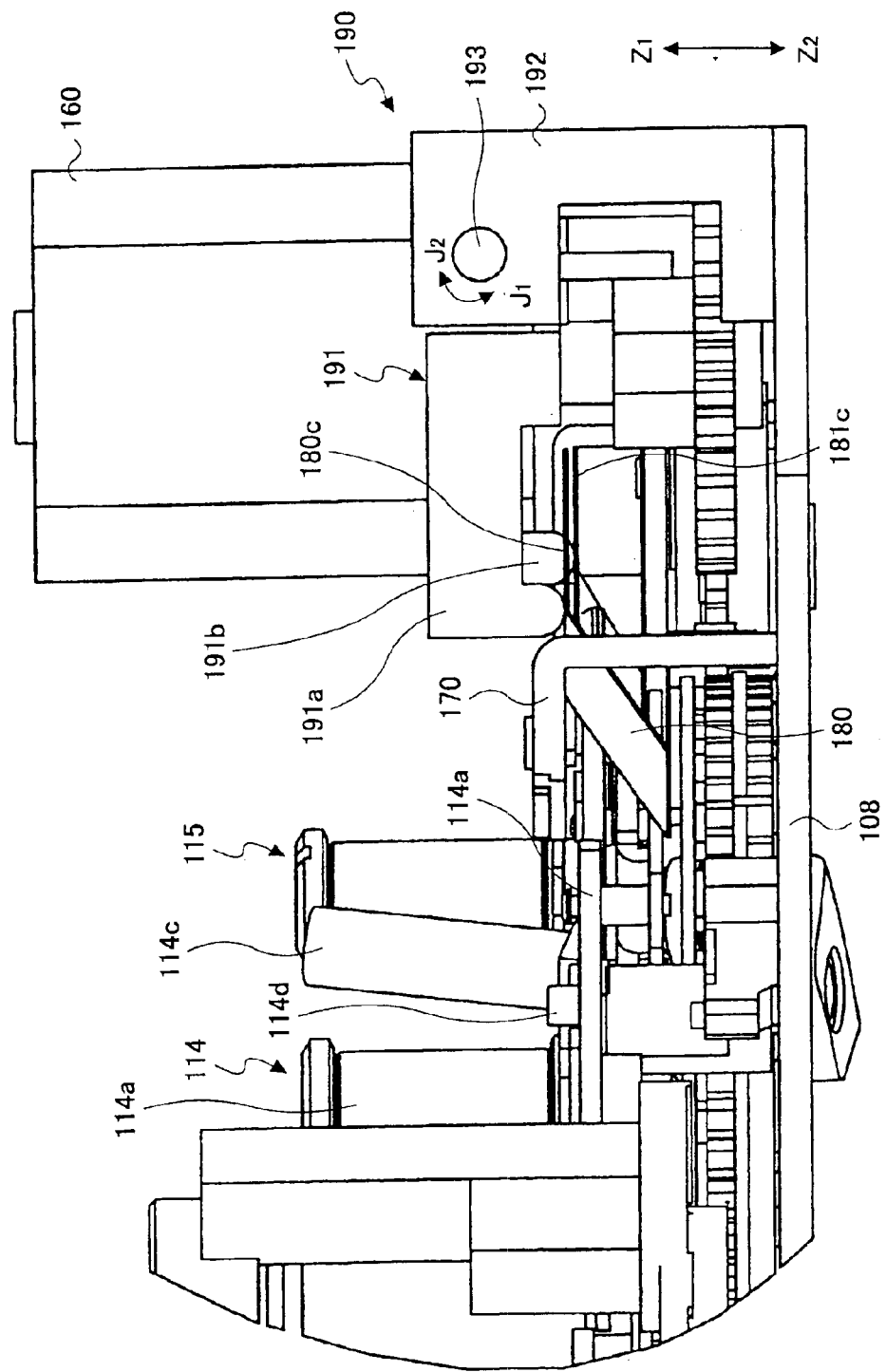

FIG.12A
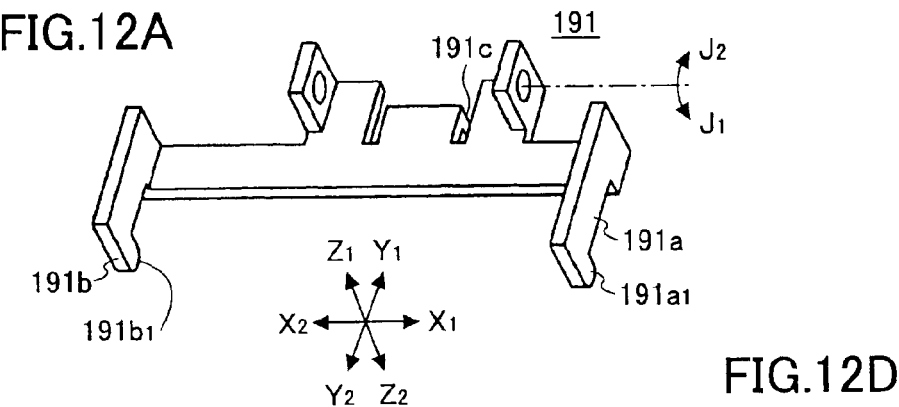
FIG.12B
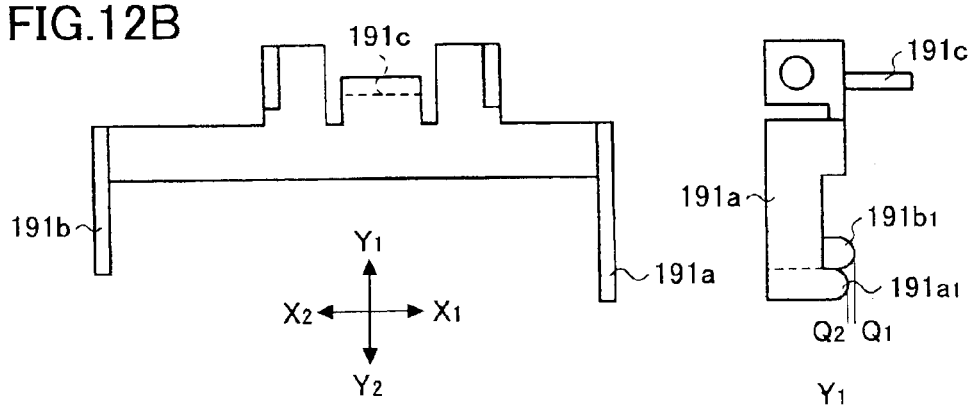
FIG.12D
FIG.12C
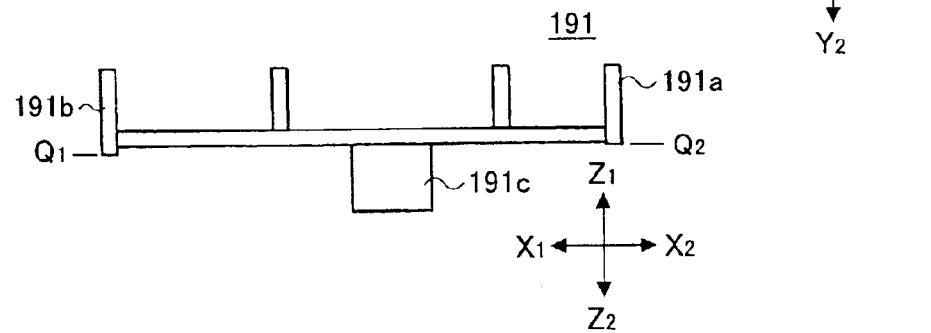

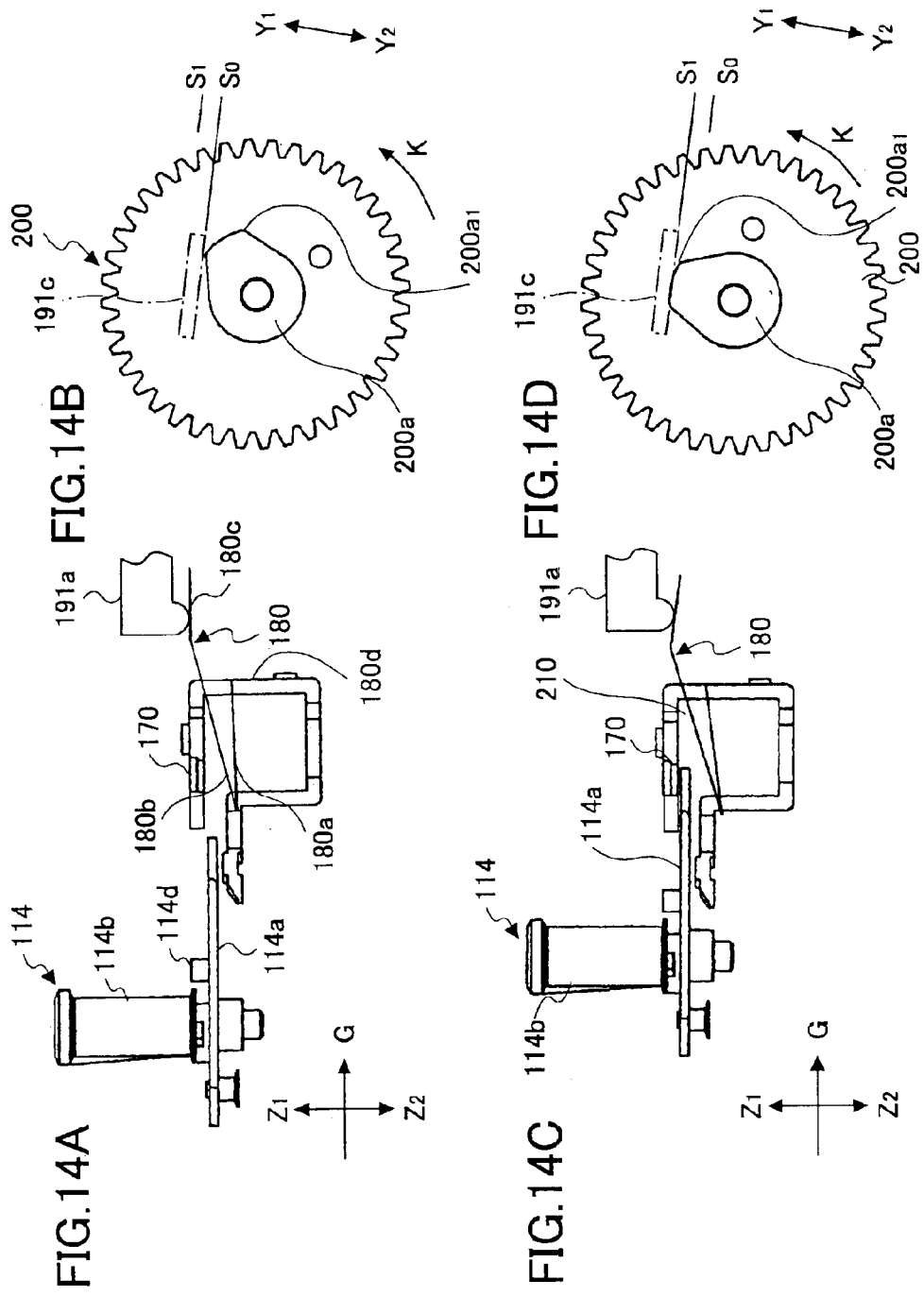

»
FIG.15B
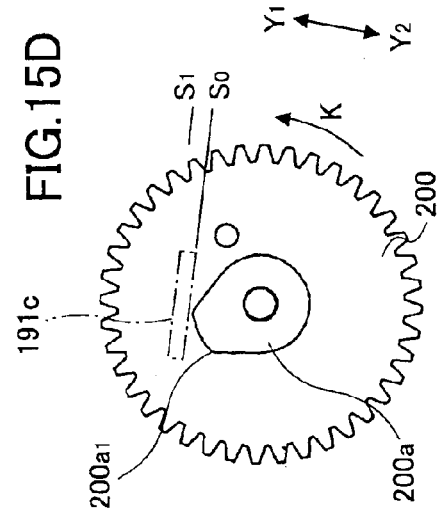
FIG.15D
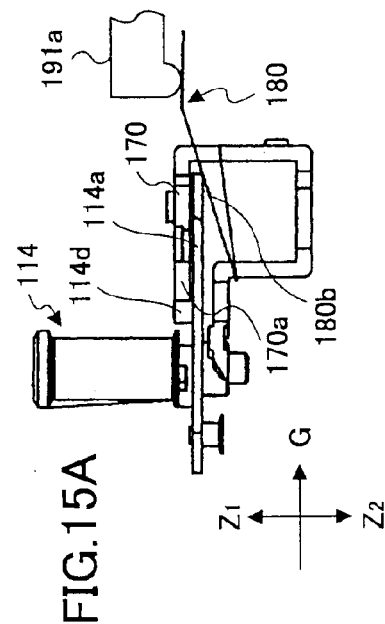
FIG.15A
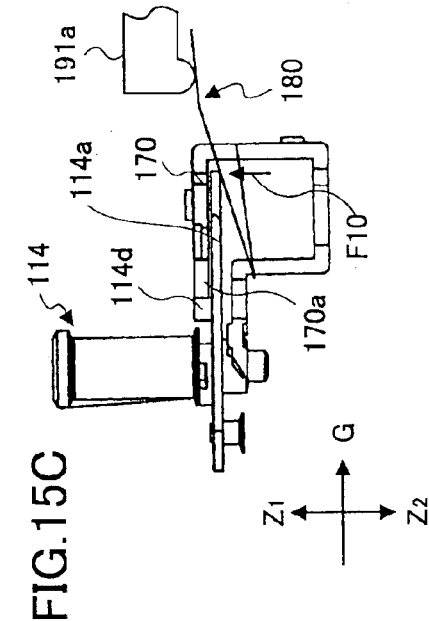
FIG.15C

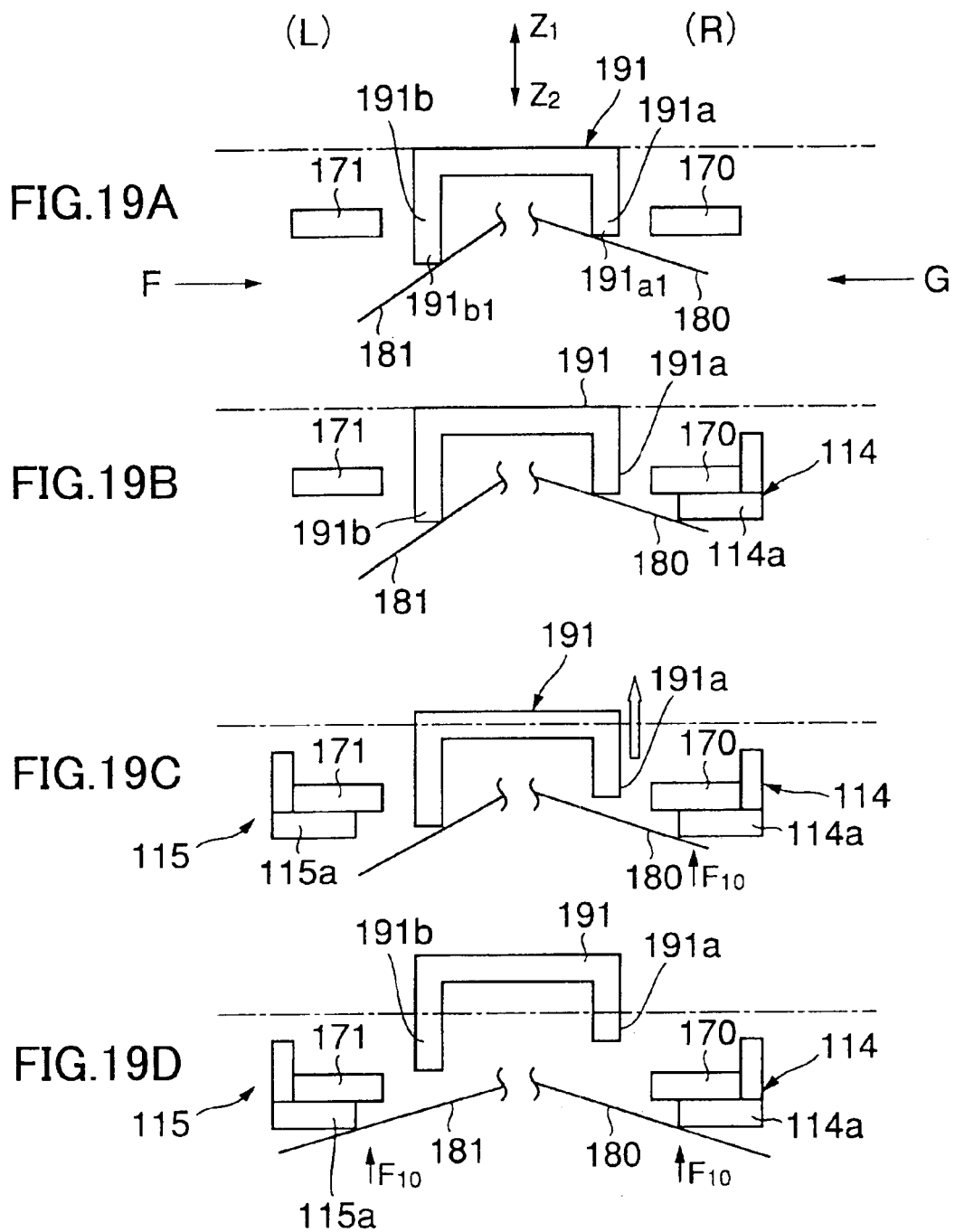

TAPE RECORDING AND REPRODUCTION APPARATUS CAPABLE OF STABLE OPERATION WITH REDUCED WEAR

BACKGROUND OF THE INVENTION

1. Field of the Invention

The present invention relates to tape recording and reproduction apparatuses including a tape loading mechanism.

2. Description of the Related Art

FIGS. 1A and 1B are diagrams showing part of a conventional magnetic tape recorder. The conventional magnetic tape recorder includes a post base 1, a tape guide pole 2, a post base catcher 3, and a leaf spring member 4. Referring to FIG. 1A, the leaf spring member 4 is in contact with the lower surface of the post base catcher 3.

Referring to FIG. 1B, in the process of the final stage of loading at which the post base 1 is moved in the U direction up to a final position $P_1$ by a tape loading mechanism, the post base 1 gets under the post base catcher 3, bending the leaf spring member 4. Then, the post base 1 is pressed against the lower surface of the post base catcher 3 by the spring force $F_1$ of the leaf spring member 4 so that the vertical position of the tape guide pole 2 is determined.

A variation in the vertical position of the tape guide pole 2 changes the path of a magnetic tape, thus adversely affecting tape recording. Accordingly, the spring force $F_1$ of the leaf spring is set to such a large value as to prevent the vertical position of the tape guide pole 2 from being changed with respect to the post base catcher 3 by the vibration of the magnetic recorder caused by an external impact applied thereto.

In every tape loading operation, the post base 1 is forced into the space between the post base catcher 3 and the leaf spring member 4. Accordingly, the load applied to the tape loading mechanism increases suddenly at the final stage of the tape loading operation. As a result, depending on circumstances, the post base 1 may stop immediately before reaching a final position $P_1$ shown in FIGS. 1A and 1B.

Further, the post base 1 rubs on (makes sliding contact with) the post base catcher 3 and the leaf spring member 4. Therefore, the wear of these components is prone to progress, thus affecting the useful service life of the magnetic recorder.

SUMMARY OF THE INVENTION

Accordingly, it is a general object of the present invention to provide a tape recorder in which the above-described disadvantages are eliminated.

A more specific object of the present invention is to provide a tape recording and reproduction apparatus ensuring that the post base reaches its final position without rubbing on the leaf spring member.

The above objects of the present invention are achieved by a tape recording and reproduction apparatus for recording data on and reproducing data from a tape, including: a post base to which a tape guide post is provided; a leaf spring member pressing the post base against a post base catcher; and a leaf spring member control part that presses the leaf spring member so that a gap for the post base to enter is formed between the post base catcher and the leaf spring member, and removes the press on the leaf spring member so that the leaf spring member presses the post base against the post base catcher, wherein: the post base is moved by a tape loading mechanism to be pressed against the post base catcher by the leaf spring member so that a vertical position of the tape guide post is determined, thereby forming a predetermined tape path when the tape is loaded; the leaf spring member control part presses the leaf spring member so as to form the gap when the post base moves to a side of the post base catcher which side opposes the leaf spring member; and the leaf spring member control part removes the press on the leaf spring member when the post base enters the gap between the post base catcher and the leaf spring member.

Since the gap is previously formed so that the post base enters the gap, it is ensured that the post base reaches the final position. Further, when the post base enters the previously formed gap, the leaf spring member control part operates to remove the press on the leaf spring member so that the leaf spring member presses the post base against the post base catcher. Therefore, the post base is prevented from rubbing on (making sliding contact with) the leaf spring member while the post base is entering the gap, thus solving the problem of friction and wear. Since the post base is prevented from rubbing on the leaf spring member while the post base is entering the gap, the leaf spring member is allowed to exert such a strong force as to firmly control the vertical position of the tape guide post.

BRIEF DESCRIPTION OF THE DRAWINGS

Other objects, features and advantages of the present invention will become more apparent from the following detailed description when read in conjunction with the accompanying drawings, in which:

FIG. 8 is a plan view of the R and L tape guide post units and the leaf spring member control mechanism in a state where the tape loading operation is completed according to the embodiment of the present invention;

FIG. 11 is an enlarged side view of the leaf spring member control mechanism and its periphery of FIG. 10 according to the embodiment of the present invention;

FIGS. 12A through 12D are a perspective view, a top plan view, a rear view, and a side view, respectively, of a press lever of the leaf spring member control mechanism according to the embodiment of the present invention;

FIGS. 14A through 14D are diagrams showing an operation of the R tape guide post unit and a corresponding operation of the leaf spring member control mechanism at the final stage of the tape loading operation according to the embodiment of the present invention;

FIGS. 15A through 15D are additional diagrams showing the operation of the R tape guide post unit and the corresponding operation of the leaf spring member control mechanism at the final stage of the tape loading operation according to the embodiment of the present invention;

FIGS. 19A through 19D are schematic diagrams showing the operations of the R and L tape guide post units and the operation of the leaf spring member control mechanism according to the embodiment of the present invention.

DETAILED DESCRIPTION OF THE PREFERRED EMBODIMENTS

A description is given below, with reference to the accompanying drawings, of an embodiment of the present invention.

Figures 1A, 1B:
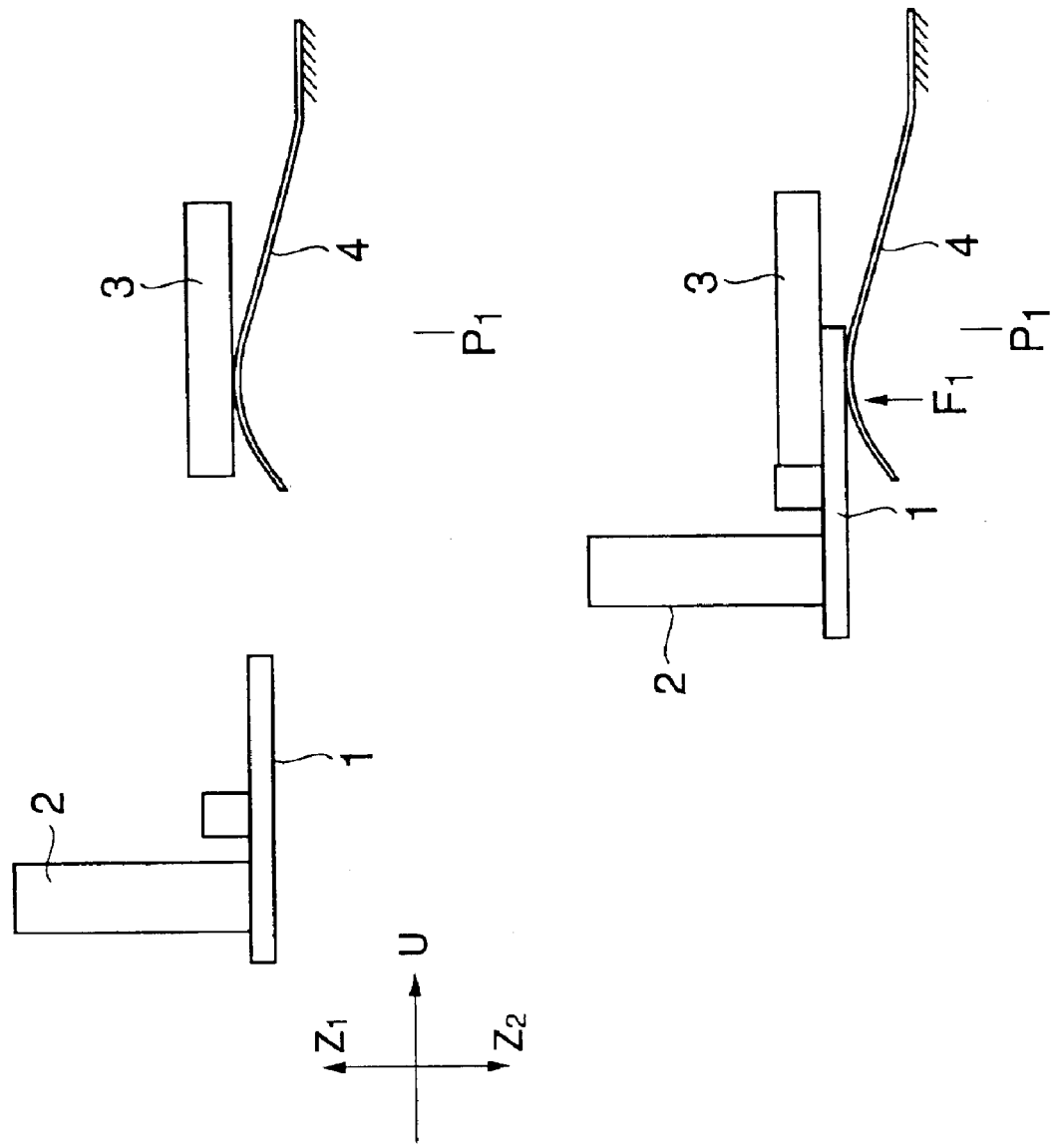
FIGS. 1A and 1B are diagrams showing part of a conventional magnetic tape recorder.
Figure 2:
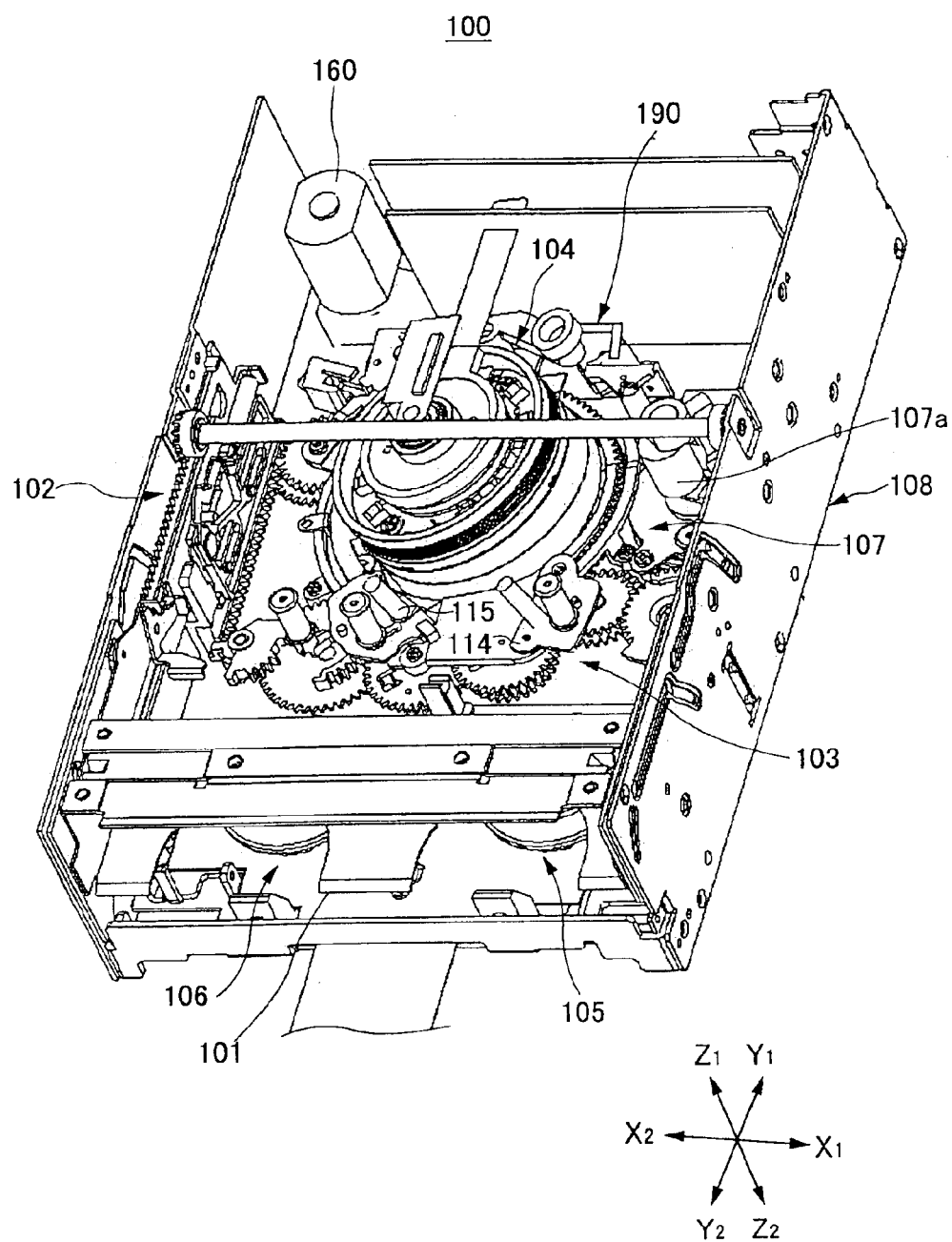
FIG. 2 is a perspective view of a magnetic recording and reproduction apparatus in the state of a stop mode according to an embodiment of the present invention.
Figure 3:
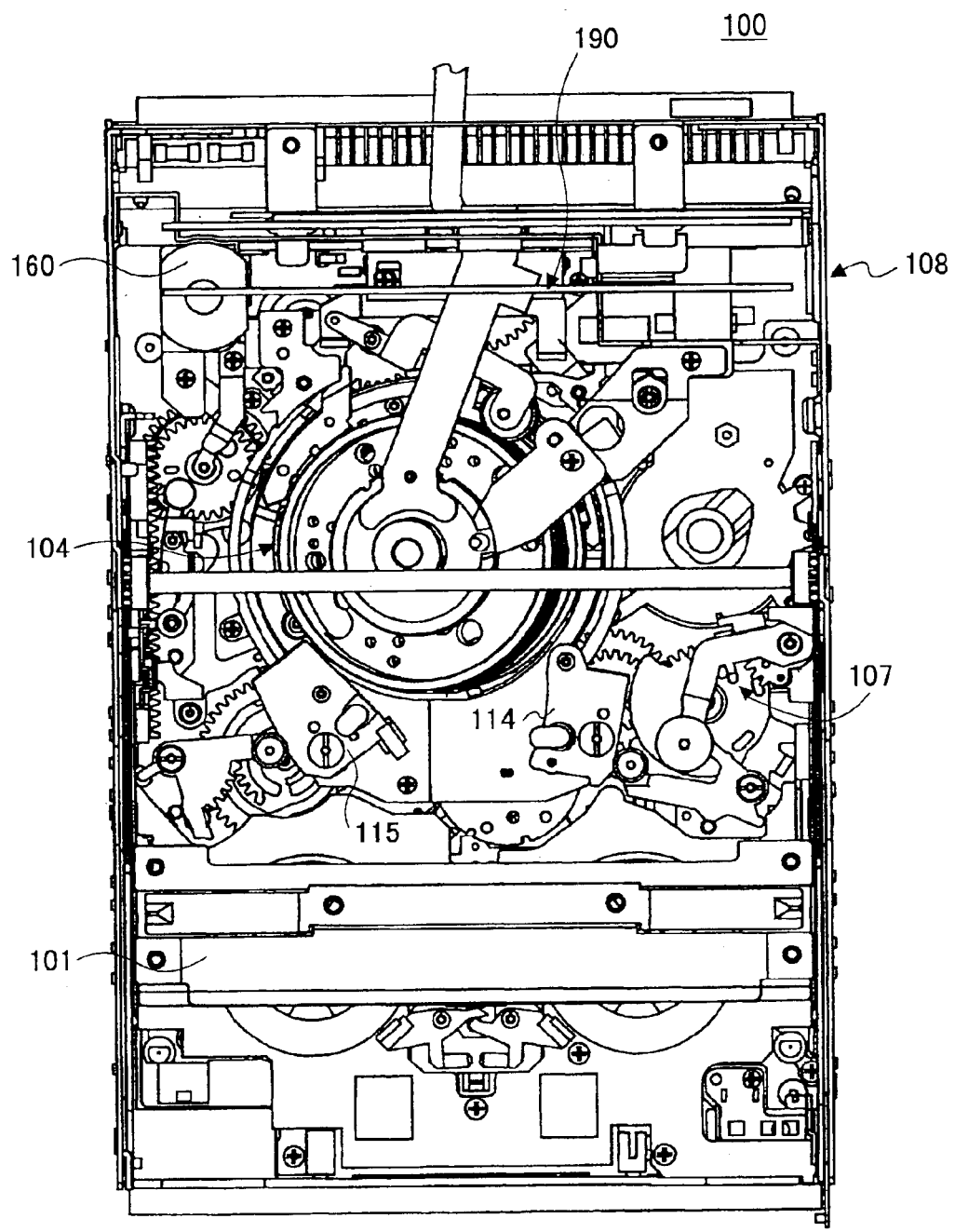
FIG. 3 is a plan view of the magnetic recording and reproduction apparatus of FIG. 2 according to the embodiment of the present invention.
Figure 4:
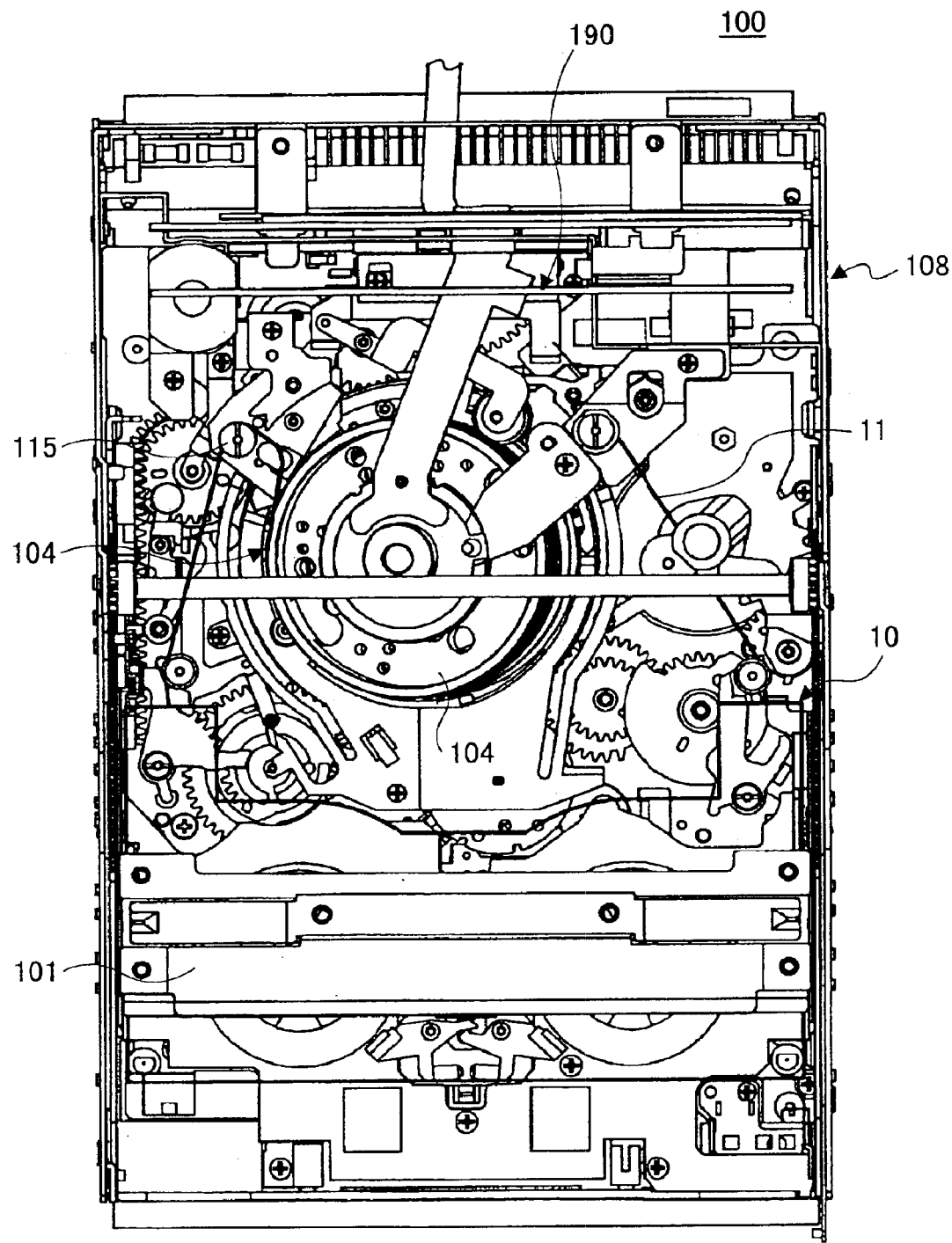
FIG. 4 is a plan view of the magnetic recording and reproduction apparatus in a state where tape loading is completed according to the embodiment of the present invention.

FIGS. 2 and 3 are a perspective view and a plan view, respectively, of a magnetic recording and reproduction apparatus 100 in the state of a stop mode according to the embodiment of the present invention. FIG. 4 is a plan view of the magnetic recording and reproduction apparatus 100 in the state where tape loading is completed. The magnetic recording and reproduction apparatus 100 is a streamer employed, for instance, as external storage for a computer. The magnetic recording and reproduction apparatus 100 includes: a holder 101 in which a tape cassette 10 (only the outline thereof is shown in FIG. 4 by the solid line) is inserted; a holder transporting mechanism 102 for transporting the holder 101 to a loading position; a tape loading mechanism 103 for pulling out a magnetic tape 11 wound around the reels of the tape cassette 10; a rotary drum unit 104 around which the magnetic tape 11 is wound a predetermined angle by the tape loading mechanism 103; reel driving mechanisms 105 and 106 for rotating the reels of the tape cassette 10; a pinch roller mechanism 107; and a main chassis 108 supporting these mechanisms.

A description is given of the tape loading mechanism 103.

Figure 5:
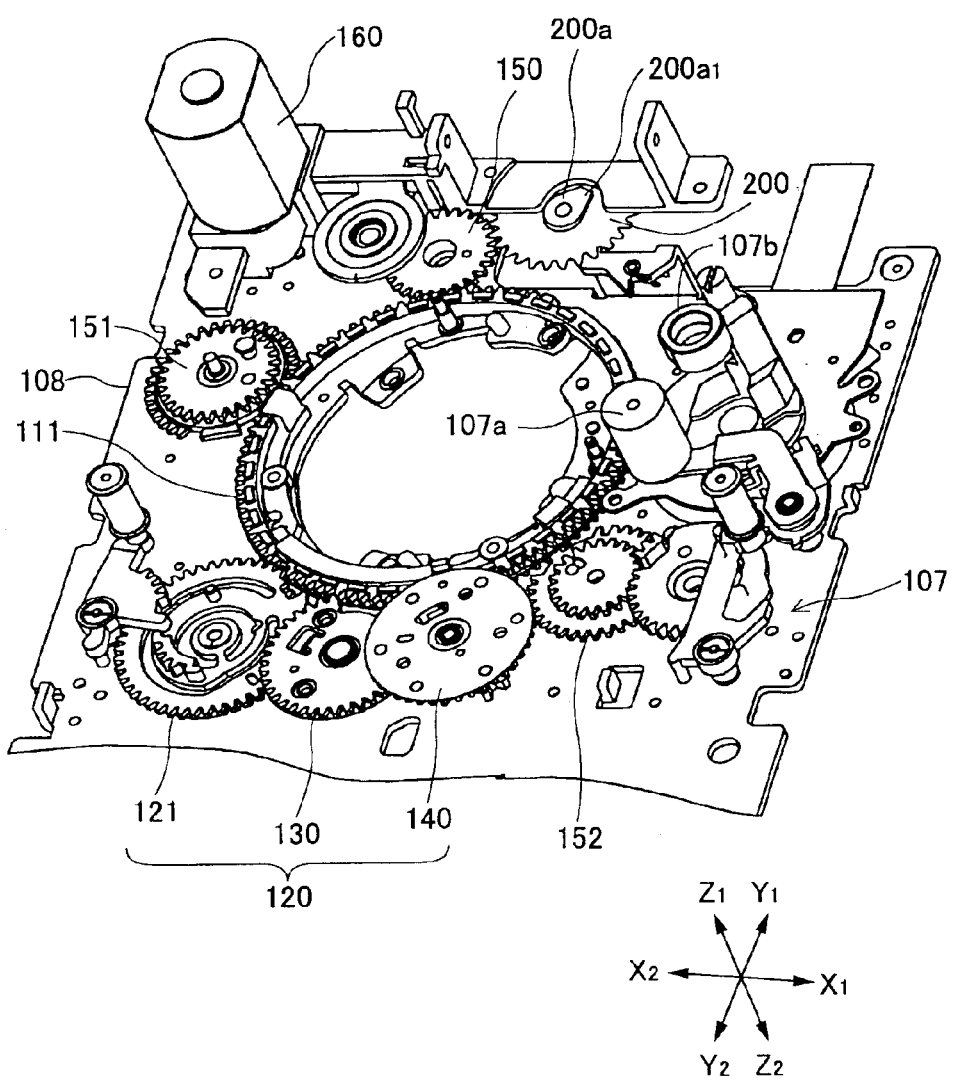
FIG. 5 is a perspective view of part of a tape loading mechanism of the magnetic recording and reproduction apparatus according to the embodiment of the present invention.
Figure 6:
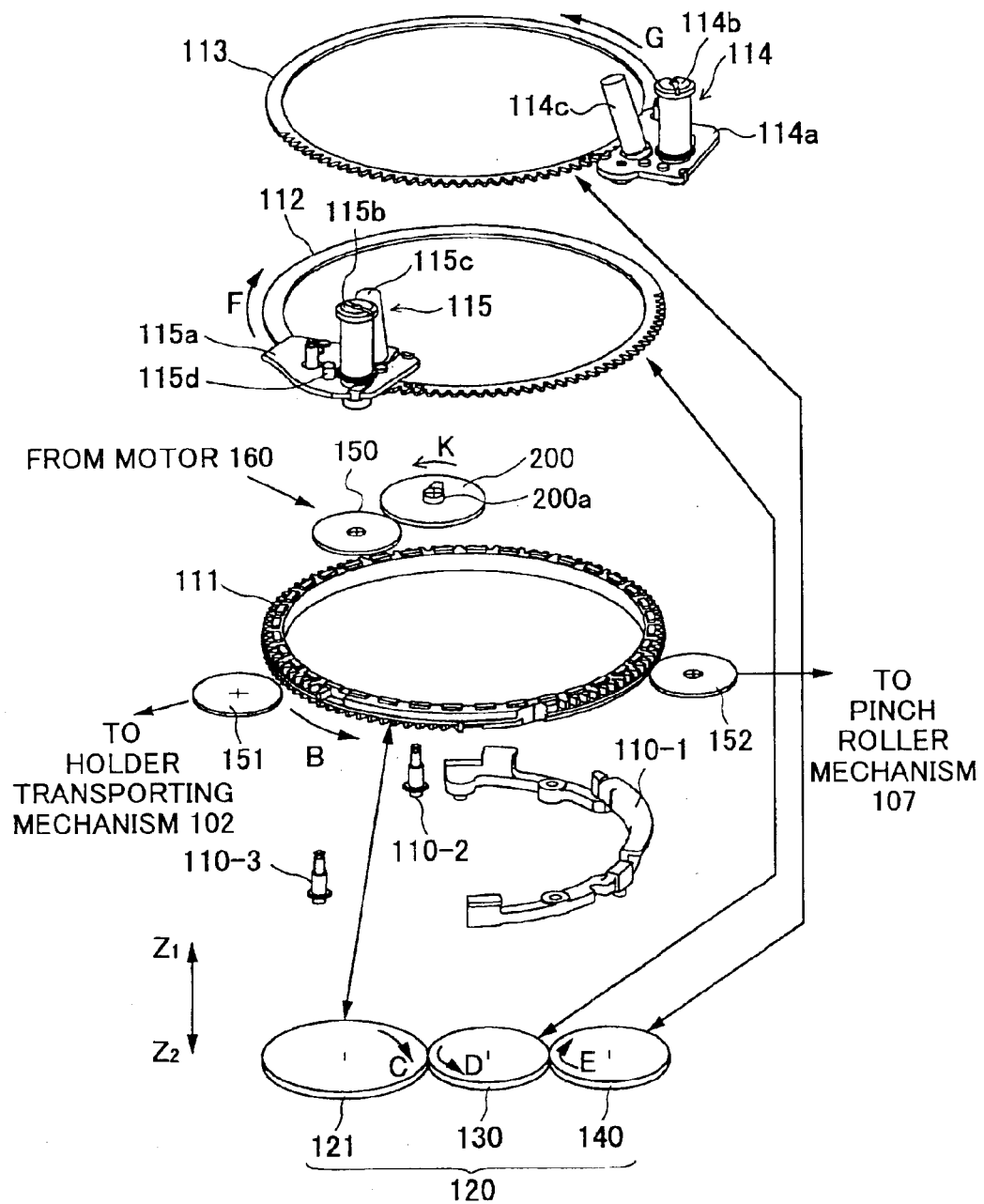
FIG. 6 is an exploded perspective view of the tape loading mechanism according to the embodiment of the present invention.

FIG. 5 is a perspective view of part of the tape loading mechanism 103, and FIG. 6 is an exploded perspective view of the tape loading mechanism 103.

Referring to FIGS. 5 and 6, a ring guide member 110-1 and guide shafts 110-2 and 110-3 are fixed to the center of the main chassis 108. A driving ring gear member 111, an L ring gear member 112, and an R ring gear member 113 are superimposed on and supported by the ring guide member 110-1 and the guide shafts 110-2 and 110-3 so as to be rotatable independent of one another. An R tape guide post unit 114 is attached to the R ring gear member 113, and an L tape guide post unit 115 is attached to the L ring gear member 112.

Figure 7:
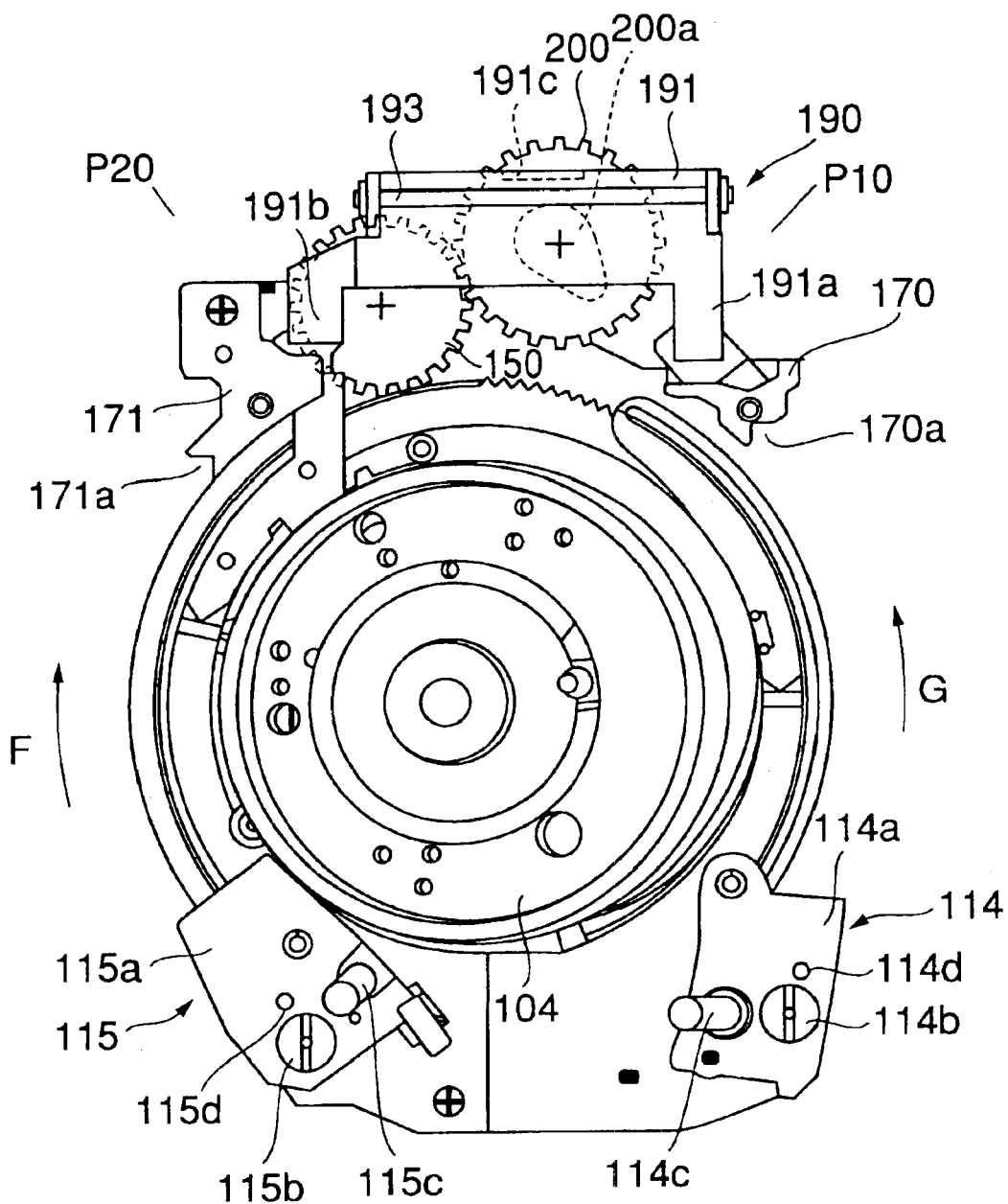
FIG. 7 is a plan view of R and L tape guide post units and a leaf spring member control mechanism of the magnetic recording and reproduction apparatus in a state before the start of a tape loading operation according to the embodiment of the present invention.

FIG. 7 is a plan view of the R and L tape guide post units 114 and 115 and a leaf spring member control mechanism 190 for pressing leaf spring members 180 and 181 (FIG. 9) and removing a press (press force) thereon in the state before the start of a tape loading operation. FIG. 8 is a plan view of the R and L tape guide post units 114 and 115 and the leaf spring member control mechanism 190 in the state where the tape loading operation is completed.

Referring to FIGS. 6 through 8, the R tape guide post unit 114 includes a plate-like post base 114a, a pair of tape guide posts 114b and 114c provided on the post base 114a, and a stopper projection 114d provided in the vicinity of the tape guide post 114b on the post base 114a. Like the R tape guide post unit 114, the L tape guide post unit 115 includes a post base 115a, a pair of tape guide posts 115b and 115c, and a stopper projection 115d.

Referring to FIGS. 7 and 8, an R post base catcher 170 is formed by bending part of the main chassis 108 by pressing. The R post base catcher 170 serves as a stopper to the R tape guide post unit 114 moving in the direction indicated by arrow G in FIGS. 6 and 7. The R post base catcher 170 is positioned on the $Y_1$ side of the $X_1$ side of the rotary drum unit 104 above the main chassis 108 so as to project in the $Y_2$ direction. The R post base catcher 170 includes a V-shaped part 170a.

An L post base catcher 171 is attached to the main chassis 108. The L post base catcher 171 serves as a stopper to the L tape guide post unit 115 moving in the direction indicated by arrow F in FIGS. 6 and 7. The L post base catcher 171 is positioned on the $Y_1$ side of the $X_2$ side of the rotary drum unit 104 above the main chassis 108 so as to project in the $Y_2$ direction. The L post base catcher 171 includes a V-shaped part 171a.

A gear mechanism 120 is provided on the main chassis 108. The gear mechanism 120 includes a gear member 121 engaging the driving ring gear member 111, a first gear assembly 130 engaging the gear member 121, and a second gear assembly 140 engaging the first gear assembly 130. The first gear assembly 130 engages the L ring gear member 112, and the second gear assembly 140 engages the R ring gear member 113. Each of the first and second gear assemblies 130 and 140 includes a torsion coil spring (not graphically represented).

In addition to the gear assembly 120, a gear member 150, an intermittent gear member 151, and an intermittent gear member 152 are disposed around the driving ring gear member 111 (FIG. 5).

When a motor 160 is started, its rotation is transmitted through the gear member 150 to the driving ring gear member 111 so that the driving ring gear member 111 is rotated counterclockwise (in the B direction in FIG.6). During the transmission, the speed of the rotation is reduced. The rotation of the driving ring gear member 111 is transmitted to the intermittent gear member 151, the gear member 121, and the intermittent gear member 152 according to predetermined timing. As a result, the intermittent gear member 151, the gear member 121, and the intermittent gear member 152 are intermittently rotated. Rotating the intermittent gear member 151 causes the holder transporting mechanism 102 to operate to load the tape cassette 10. The gear member 121 is rotated in the C direction (FIG. 6). When the gear member 121 is rotated in the C direction, the first gear assembly 130 is rotated in the D direction (FIG. 6). As a result, the L ring gear member 112 is rotated in the F direction (FIG. 6) through the first gear assembly 130. Simultaneously, the second gear assembly 140 is rotated in the E direction (FIG. 6), so that the R ring gear member 112 is rotated in the G direction (FIG. 6) through the second gear assembly 140. As a result, the tape guide post units 115 and 114 are moved as shown in FIG. 8 so as to pull out the magnetic tape 11 from the tape cassette 10.

As shown in FIG. 8, the post base 114a of the R tape guide post unit 114 gets under the lower side of the R post base catcher 170 so that the stopper projection 114d fits in with the V-shaped part 170a. Thus, the R tape post guide unit 114 reaches a final position $P_{10}$ and is prevented from moving any further in the G direction (FIG. 7). The post base 115a of the L tape guide post unit 115 gets under the lower side of the L post base catcher 171 so that the stopper projection 115d fits in with the V-shaped part 171a. Thus, the L tape post guide unit 115 reaches a final position $P_{20}$ and is prevented from moving any further in the F direction (FIG. 7).

The motor 160 is driven further for a short period before being stopped. Due to the driving of the motor 160 during this period, each of the torsion coil springs of the first and second gear assemblies 130 and 140 is twisted so that a spring force is generated in each of the torsion coil springs. These spring forces press the stopper projections 114d and 115d against the V-shaped parts 170a and 171a, respectively, so that the tape guide post units 114 and 115 are fixed to their respective final positions $P_{10}$ and $P_{20}$. As a result, the magnetic tape 11 is loaded, wound over an angular range of approximately 220° around the rotary drum unit 104.

Further, the rotation of the intermittent gear member 152 causes the pinch roller mechanism 107 to operate so that a pinch roller 107a presses the magnetic tape 11 against a capstan 107b (FIG. 5), thereby pinching the magnetic tape 11. The magnetic tape 11 is driven, pinched and held by the pinch roller 107a and the capstan 107b, so as to run back and forth along the rotary drum unit 104 so that information may be recorded on the magnetic tape 11.

In order to average the load applied to the motor 160 at the final stage of a tape loading operation, the stopper projection 114d of the R tape guide post unit 114 fits in with the V-shaped part 170a first, and a little later, the stopper projection 115d of the L tape guide post unit 115 fits in with the V-shaped part 171a.

Next, a description is given of the configuration and the operation of a mechanism that determines the vertical position of each of the tape guide post units 114 and 115 when tape loading is completed.

Figure 9:
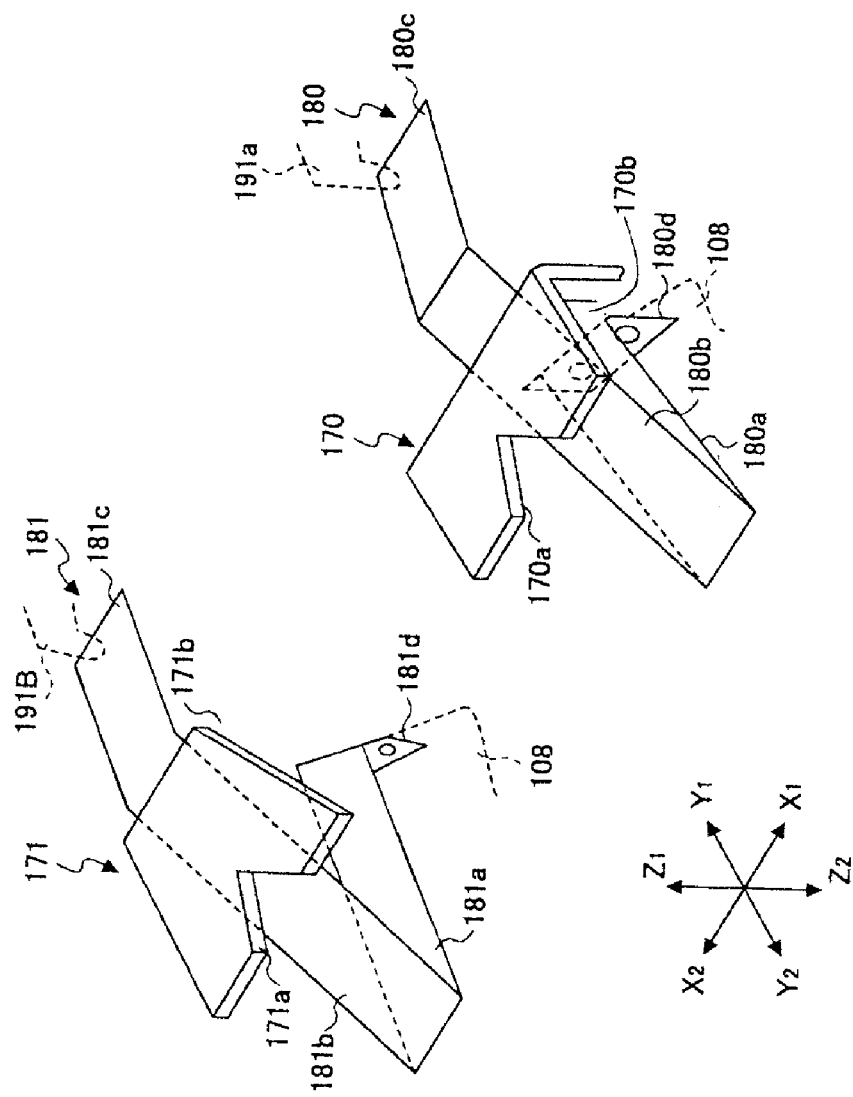
FIG. 9 is a diagram showing leaf spring members together with corresponding R and L post base catchers of the magnetic recording and reproduction apparatus according to the embodiment of the present invention.

FIG. 9 is a diagram showing the leaf spring members 180 and 181 together with the corresponding R and L post base catchers 170 and 171. For convenience of graphical representation, the post base catchers 170 and 171 are shown simplified in FIG. 9.

The leaf spring member 180 is formed by bending a strip of metal into a substantially V-shape. The leaf spring member 180 includes a cantilever part 180a, a folded-back inclination part 180b connected to one end of the cantilever part 180a to be folded back therefrom with an inclination to the cantilever part 180a, an extension part 180c extending from the folded-back inclination part 180b, and a lug part 180d forming the base end of the cantilever part 180a.

Figure 10:
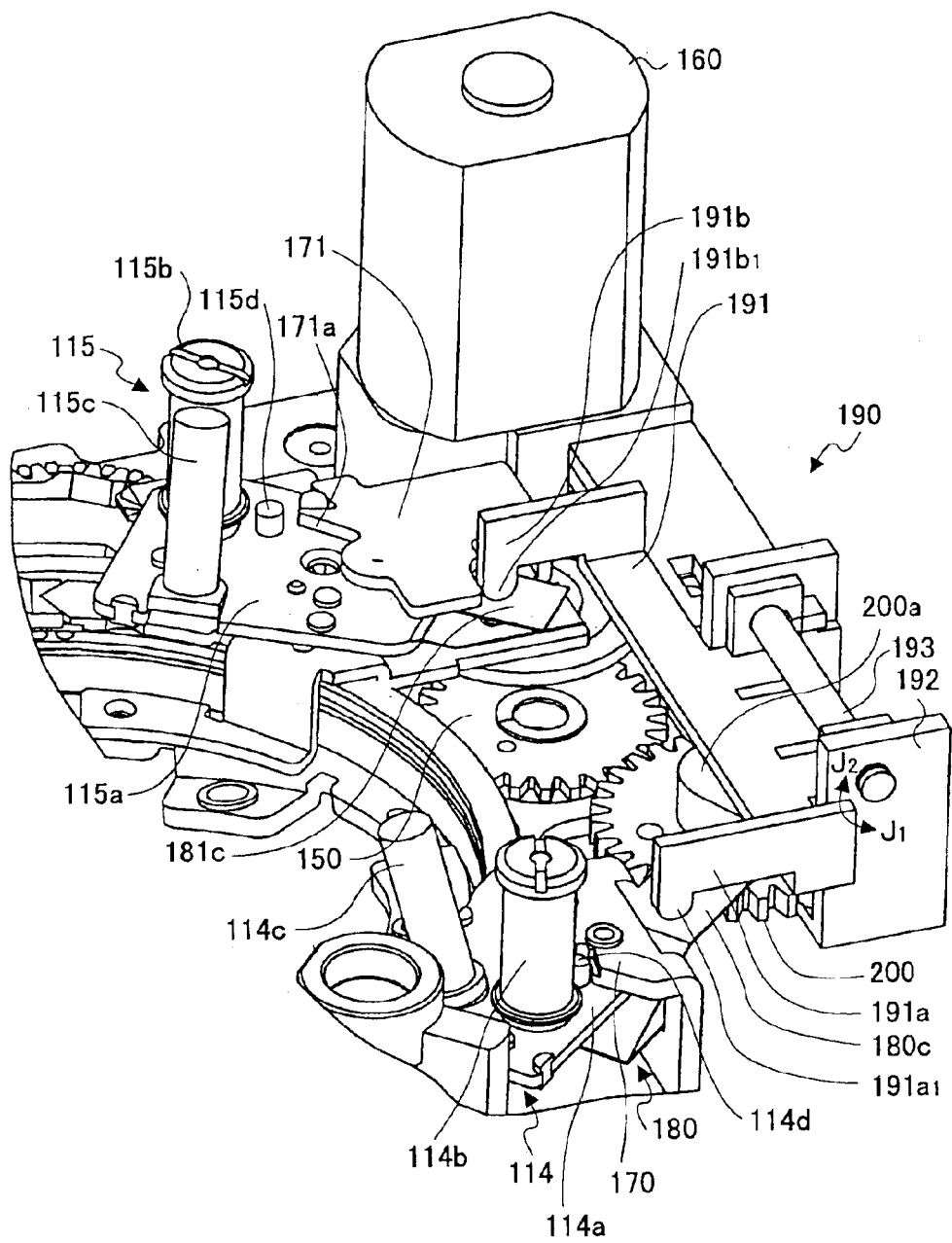
FIG. 10 is an enlarged perspective view of the leaf spring member control mechanism and its periphery in a state immediately before the final stage of tape loading according to the embodiment of the present invention.

The leaf spring member 180 is attached by fixing the lug part 180d to the main chassis 108. Referring to FIGS. 10 and 14A, the folded-back inclination part 180b is positioned below the R post base catcher 170 so as to extend through an opening 170b of the R post base catcher 170 in the $Y_1$ direction. Particularly, the cantilever part 180a and the folded-back inclination part 180b function as a leaf spring bendable in the $Z_1$ and $Z_2$ directions.

Like the leaf spring member 180, the leaf spring member 181 is formed by bending a strip of metal into a substantially V-shape. The leaf spring member 181 includes a cantilever part 181a, a folded-back inclination part 181b connected to one end of the cantilever part 181a to be folded back therefrom with an inclination to the cantilever part 181a, an extension part 181c extending from the folded-back inclination part 181b, and a lug part 181d forming the base end of the cantilever part 181a.

The leaf spring member 181 is attached by fixing the lug part 181d to the main chassis 108. Referring to FIG. 10 and FIG. 14A as well, the folded-back inclination part 181b is positioned below the L post base catcher 171 so as to extend through a cutout 171b of the L post base catcher 171 in the $Y_1$, direction. Particularly, the cantilever part 181a and the folded-back inclination part 181b function as a leaf spring bendable in the $Z_1$ and $Z_2$ directions.

The folded-back inclination parts 180b and 181b serve to guide the post bases 114a and 115a, respectively, to below-described gaps 210 (FIG. 14C).

The leaf spring members 180 and 181 have such spring forces as to be able to control the vertical positions of the tape guide post units 114 and 115, respectively, with sufficient firmness.

Figure 13:
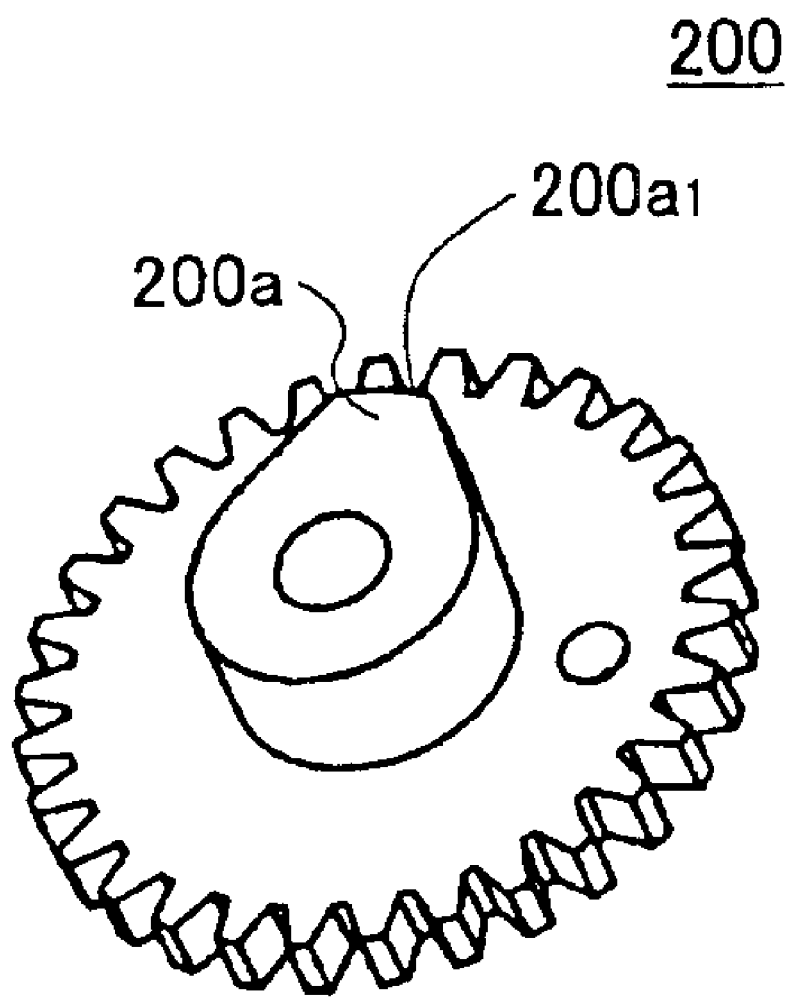
FIG. 13 is a perspective view of a cam gear of the leaf spring member control mechanism according to the embodiment of the present invention.

FIGS. 10 and 11 are diagrams showing the leaf spring member control mechanism 190. As shown in FIGS. 3, 4, 7, 8, and 10, the leaf spring member control mechanism 190 is positioned on the $Y_1$ side of the rotary drum unit 104. The leaf spring member control mechanism 190 includes a press lever 191 and a cam gear 200. FIGS. 12A through 12D are a perspective view, a top plan view, a rear view, and a side view, respectively, of the press lever 191. FIG. 13 is a perspective view of the cam gear 200. As described below, the leaf spring member control mechanism 190 operates in connection with a tape loading operation at its final stage.

Referring to FIGS. 10 and 11, the press lever 191 is supported on a U-shaped bracket 192, which is part of the main chassis 108, by a horizontal shaft member 193 so as to be rotatable in the $J_1$ and $J_2$ directions. Referring to FIGS. 12A through 12D, the press lever 191 includes L-shaped R and L arm parts 191a and 191b provided on its $X_1$ and $X_2$ sides, respectively, so as to extend in the $Y_2$ direction. Further, the press lever 191 includes a cam engagement part 191c provided in its center part so as to extend in the $Z_2$ direction. The R and L arm parts 191a and 191b oppose the extension part 180c of the leaf spring member 180 and the extension part 181c of the leaf spring member 181, respectively.

Referring to FIG. 13, the cam gear 200 is supported by a shaft provided on the main chassis 108. The cam gear 200 engages the gear member 150 so as to be rotatable through the gear member 150 by the driving force of the motor 160. The cam gear 200 includes a cam 200a. The cam 200a includes a radially projecting arcuate part $200a_1$. The cam 200a opposes the cam engagement part 191c of the press lever 191. The cam 200a pushes against the cam engagement part 191c and loses contact therewith according to the rotational position of the cam gear 200.

Next, a description is given of the operation of the leaf spring member control mechanism 190. The description is based on only the R tape guide post unit 114 and the leaf spring member 180 for convenience of description.

The leaf spring member control part 190 is in the state shown in FIGS. 10, 11, 14A, and 14B immediately before the tape loading operation proceeds to reach its final stage. The R arm part 191a is simply placed on the extension part 180c of the leaf spring member 180. The leaf spring member 180 is pressed against the lower surface of the R post base catcher 170 with no gap formed between the leaf spring member 180 and the R post base catcher 170.

When the tape loading operation reaches its final stage, the cam 200a starts to push the cam engagement part 191c. The R tape guide post unit 114 reaches a position close to the R post base catcher 170.

Figure 16:
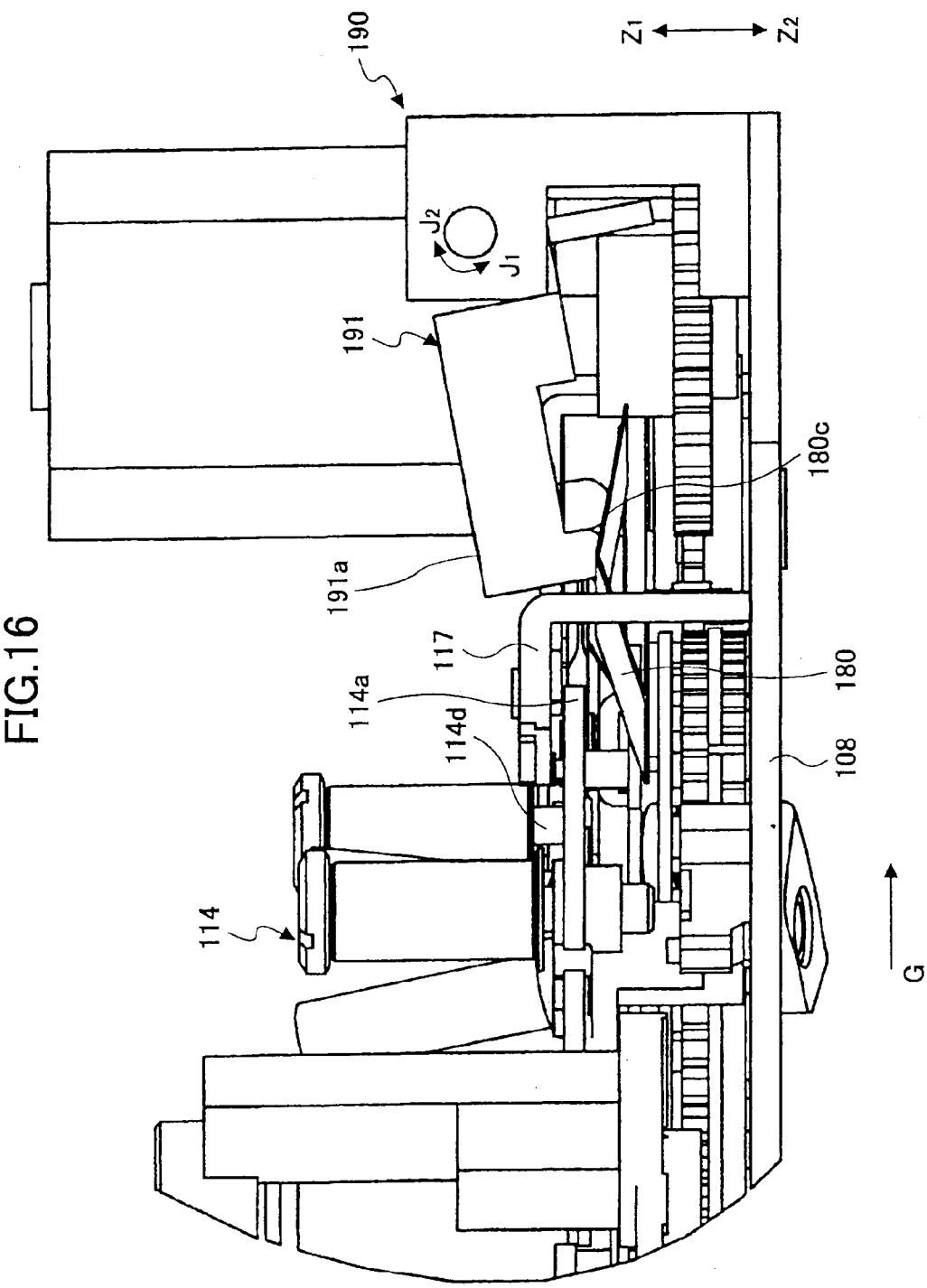
FIG. 16 is a side view of the R tape guide post unit and the leaf spring member control mechanism in the state of FIGS. 14C and 14D according to the embodiment of the present invention.

Next, the leaf spring member control mechanism 190 enters the state shown in FIGS. 14C, 14D, and 16. The projecting arcuate part $200a_1$ of the cam 200a pushes the cam engagement part 191c. As a result, the cam engagement part 191c is moved in the $Y_1$ direction from a position $S_o$ to a position $S_1$ (FIG. 14D) so as to rotate the press lever 191 in the $J_1$, direction (FIG. 16). Consequently, the R arm part 191a presses the extension part 180c of the leaf spring member 180 toward the $Z_2$ direction (FIGS. 14C and 16). The gap 210 having substantially the same $Z_1$–$Z_2$ dimension as the thickness of the post base 114a is formed between the leaf spring member 180 and the R post base catcher 170. The post base 114a starts to get under the lower surface of the R post base catcher 170.

Figure 17:
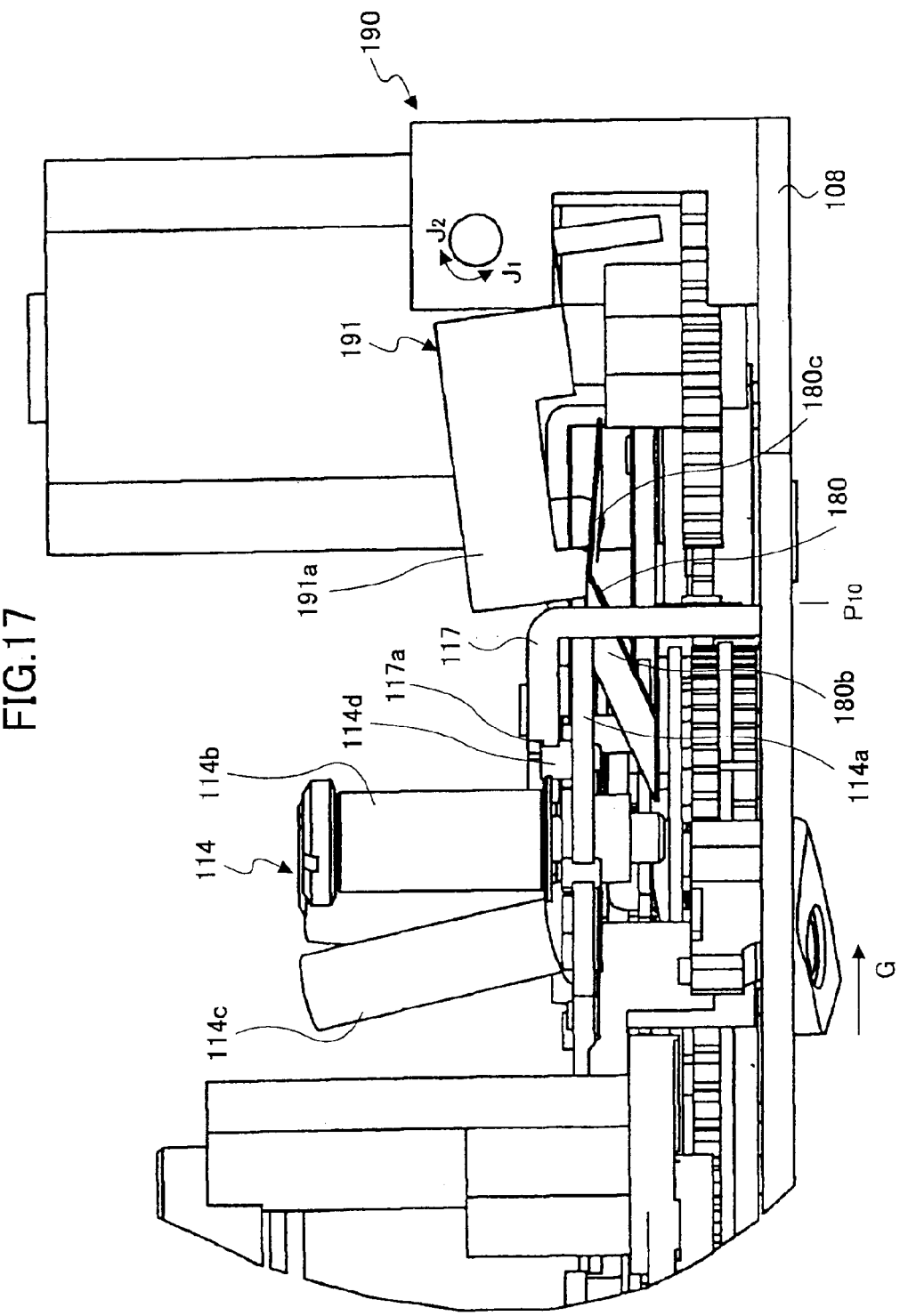
FIG. 17 is a side view of the R tape guide post unit and the leaf spring member control mechanism in the state of FIGS. 15A and 15B according to the embodiment of the present invention.

Next, the leaf spring member control mechanism 190 enters the state shown in FIGS. 15A, 15B, and 17. The projecting arcuate part $200a_1$, of the cam 200 continues engaging and stopping the cam engagement part 191c. As a result, the rotational movement of the press lever 191 in the $J_2$ direction (FIG. 17) continues to be controlled, so that the gap 210 is maintained. The tape loading operation further proceeds so that the post base 114a moves in the G direction (FIGS. 15A and 17) so as to get under the lower surface of the R post base catcher 170 and enter the gap 210. As a result, the stopper projection 114d fits in with the V-shaped part 170a, and the post base 114a reaches the final position $P_{10}$ shown in FIG. 17.

The gap 210 prevents the leaf spring member 180 from hindering the movement of the post base 114a to the final position $P_{10}$ even if the leaf spring member 180 has a strong spring force. Accordingly, it is ensured that the post base 114a reaches the final position $P_{10}$ where the stopper projection 114d fits in with the V-shaped part 170a. Further, the post base 114a is prevented from rubbing on (having sliding contact with) the leaf spring member 180, thus causing no wear.

Figure 18:
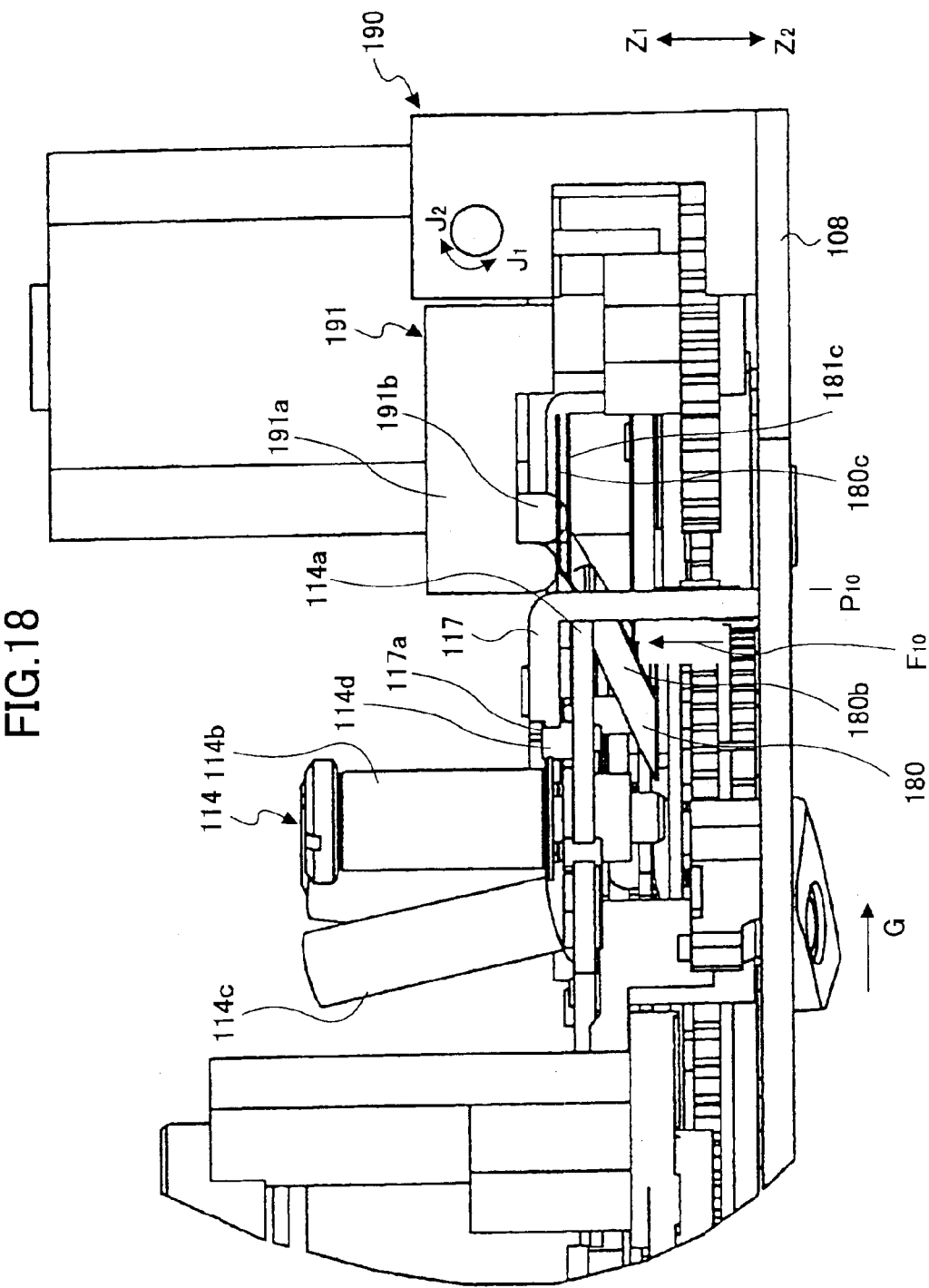
FIG. 18 is a side view of the R tape guide post unit and the leaf spring member control mechanism in the state of FIGS. 15C and 15D according to the embodiment of the present invention.

Next, the leaf spring member control mechanism 190 enters the state shown in FIGS. 15C, 15D, and 18. The projecting arcuate part $200a_1$, of the cam 200 starts to lose contact with or disengage from the cam engagement part 191c so as to remove the control on the rotational movement of the press lever 191 in the $J_2$ direction (FIG. 18). As a result, the press on the leaf spring member 180 by the R arm part 191a is removed, and the post base 114a is pressed against the lower surface of the R post base catcher 170 by a force $F_{10}$ (FIG. 18). Thereby, the vertical position of the post base 114a or the tape guide post unit 114 is firmly controlled.

While the press on the leaf spring member 180 by the R arm part 191a is being removed, the stopper projection 114d is pressed in the G direction (FIGS. 15C and 18) against the V-shaped part 170a by the spring force of the torsion coil spring included in the second gear assembly 140.

Likewise, with respect to the L tape guide post unit 115, the L arm part 191b presses the leaf spring member 181 so that the gap 210 is formed between the L post base catcher 171 and the leaf spring member 181. The post base 115a enters the gap 210, and the press on the leaf spring member 181 by the L arm part 191b is removed. As a result, the post base 115a is pressed against the lower surface of the L post base catcher 171 by the leaf spring member 181 so that the vertical position of the post base 115a or the tape guide post unit 115 is controlled.

As described above, the press on the leaf spring members 180 and 181 is removed using the driving force of the motor 160 performing the tape loading operation. Accordingly, there is no need to provide a special drive source such as a plunger to remove the press. Accordingly, the press on the leaf spring members 180 and 181 is removed with a simple configuration. Further, the rotation of the cam 200a synchronizes with the movements of the post bases 114a and 115a. Therefore, the press on the leaf spring members 180 and 181 is removed in accurate timing with good reliability.

Further, the press on the leaf spring members 180 and 181 is given and removed by the single press lever 191. Accordingly, compared with the configuration of giving and removing the press on the leaf spring members 180 and 181 by separate press levers respectively therefor, the vertical positions of the post bases 114a and 115a at the final positions $P_{10}$ and $P_{20}$ can be controlled with high reliability and a simple configuration.

Further, the gap 210 for the post base 114a to enter is formed between the R post base catcher 170 and the leaf spring member 180, and the gap 210 for the post base 115a to enter is formed between the L post base catcher 171 and the leaf spring member 181. These gaps 210 allow the leaf spring members 180 and 181 to have a strong spring force. Accordingly, even if the magnetic recording and reproduction apparatus 100 is caused to vibrate by an external impact applied thereto, the vertical positions of the tape guide posts 114b, 114c, 115b, and 115c with respect to the R and L post base catchers 170 and 171 remain unchanged so that recording and reproduction can be performed without being affected by the impact. Further, the vertical positions of the post base 114a and 115a are firmly controlled. Therefore, in the process of assembling the magnetic recording and reproduction apparatus 100, even when a force is applied in the $Z_2$ direction in adjusting the vertical positions of the tape guide posts 114b and 115b in the state where tape loading is completed, the tape guide posts 114b and 115b are prevented from being pressed down. Accordingly, this adjustment can be performed with accuracy.

Further, as previously described, the L tape guide post unit 115 reaches the final position $P_{20}$ slightly later than the R tape guide post unit 114 reaches the final position $P_{10}$. In connection with this operation, the press on the leaf spring member 181 is removed slightly later than the press on the leaf spring member 180 is removed.

A description is given below of this operation of removing the press on the leaf spring members 180 and 181.

Referring to FIGS. 12C and 12D, the vertical position $Q_1$, in the $Z_1$–$Z_2$ direction of an end part $191b_1$ of the L arm part 191b of the press lever 191 is slightly biased in the $Z_2$ direction compared with the vertical position $Q_2$ of an end part $191a_1$, of the R arm part $191a$ of the press lever $191$. That is, the end part $191b_1$, of the L arm part $191b$ is positioned lower in the $Z_1$–$Z_2$ direction (offset in the $Z_2$ direction) than the end part $191a_1$, of the R arm part $191a$.

FIGS. 19A through 19D are schematic diagrams showing the relationship among the press lever $191$, the R tape guide post unit $114$, the R post base catcher $170$, the leaf spring member $180$, the L tape guide post unit $115$, the L post base catcher $171$, and the leaf spring member $181$.

FIG. 19A schematically shows the states shown in FIGS. 14C, 14D, 15A, 15B, 16, and 17. The L arm part $191b$ presses the leaf spring member $181$ more deeply in the $Z_2$ direction than the R arm part $191a$ presses the leaf spring member $180$.

Referring to FIGS. 19B and 19C, the L tape guide post unit $115$ reaches the final position $P_{20}$ slightly later than the R tape guide post unit $114$ reaches the final position $P_{10}$.

Referring to FIGS. 19C and 19D, the press lever $191$ is rotated to move the end parts $191a_1$ and $191b_1$ of the R and L arm parts $191a$ and $191b$ in the $Z_1$ direction. As a result, the press on the leaf spring members $180$ and $181$ is removed. As shown in FIG. 19C, the press on the leaf spring member $180$ by the R arm part $191a$ is removed first. Then, as shown in FIG. 19D, the press on the leaf spring member $181$ by the L arm part $191b$ is removed slightly later. Accordingly, the post base $114a$ of the R tape guide post unit $114$ is pressed against the lower surface of the R post base catcher $170$ by the leaf spring member $180$ at the final position $P_{10}$, and the post base $115a$ of the L tape guide post unit $115$ is pressed against the lower surface of the L post base catcher $171$ by the leaf spring member $181$ at the final position $P_{20}$.

In the case of tape unloading, the motor $160$ is driven in reverse so that the above-described members operate in the reverse order in the opposite directions.

That is, first, the press lever $191$ is rotated in the $J_1$, direction. Then, the R and L arm parts $191a$ and $191b$ press the spring member $180$ and $181$, respectively, so that the gaps $210$ are formed. As a result, the press on the post bases $114a$ and $115a$ by the leaf spring members $180$ and $181$ is removed. Next, the R and L tape guide post units $114$ and $115$ are moved so that the post bases $114a$ and $115a$ come out of the downside of the R and L post base catchers $170$ and $171$, respectively. Accordingly, tape unloading is performed smoothly without the post bases $114a$ and $114b$ rubbing on the leaf spring members $180$ and $181$, respectively.

The present invention is not limited to the specifically disclosed embodiment, and variations and modifications may be made without departing from the scope of the present invention.

The present application is based on Japanese priority application No. 2002-281901, filed on Sep. 26, 2002, the entire contents of which are hereby incorporated by reference.

What is claimed is:

1. A tape recording and reproduction apparatus for recording data on and reproducing data from a tape, comprising:
    a post base to which a tape guide post is provided;
    a leaf spring member pressing said post base against a post base catcher; and
    a leaf spring member control part that presses said leaf spring member so that a gap for said post base to enter is formed between the post base catcher and said leaf spring member, and removes the press on said leaf spring member so that said leaf spring member presses said post base against the post base catcher, wherein:
    said post base is moved by a tape loading mechanism to be pressed against said post base catcher by said leaf spring member so that a vertical position of the tape guide post is determined, thereby forming a predetermined tape path when the tape is loaded;
    said leaf spring member control part presses said leaf spring member so as to form the gap when said post base moves to a side of the post base catcher which side opposes said leaf spring member; and
    said leaf spring member control part removes the press on said leaf spring member when said post base enters the gap between the post base catcher and said leaf spring member.

2. The tape recording and reproduction apparatus as claimed in claim 1, wherein said leaf spring member control part comprises:
    a rotary lever that is rotatable to press said leaf spring member;
    a cam that is rotatable in synchronization with a movement of said post base by power of the tape loading mechanism,
    wherein said cam is rotated to engage and rotate said rotary lever and to disengage from said rotary lever.

3. The tape recording and reproduction apparatus as claimed in claim 2, wherein:
    said post base comprises first and second post bases;
    said leaf spring member comprises first and second leaf spring members pressing said first and second post bases, respectively;
    said rotary lever comprises first and second arm parts pressing said first and second leaf spring members, respectively; and
    said rotary lever rotates to control an operation of said first leaf spring member and an operation of said second leaf spring member.

4. The tape recording and reproduction apparatus as claimed in claim 3, wherein said first and second arm parts of said rotary lever are adapted to have a dimensional difference so that the press on said first leaf spring member is removed later than the press on said second leaf spring member is removed.

5. The tape recording and reproduction apparatus as claimed in claim 4, wherein said first arm part of said rotary lever has a larger dimension in a direction toward said leaf spring member than said second arm part of said rotary lever.

* * * * *